Jan. 7, 1947.　　　W. J. NEWMAN　　　2,413,991
FILTER
Filed Oct. 13, 1943　　　3 Sheets-Sheet 1

Inventor
Walter J. Newman
By
McCobb, Hendl & Dickinson
Attorneys

Jan. 7, 1947.　　　W. J. NEWMAN　　　2,413,991
FILTER
Filed Oct. 13, 1943　　　3 Sheets-Sheet 2
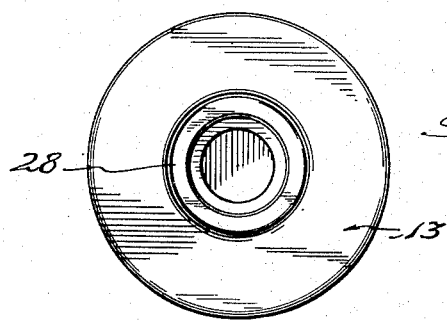
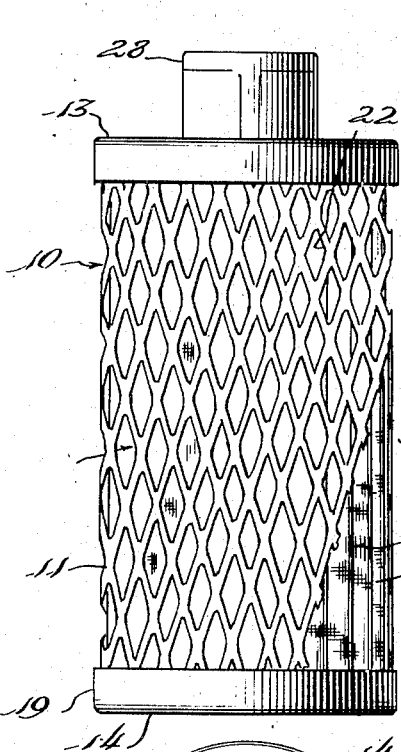
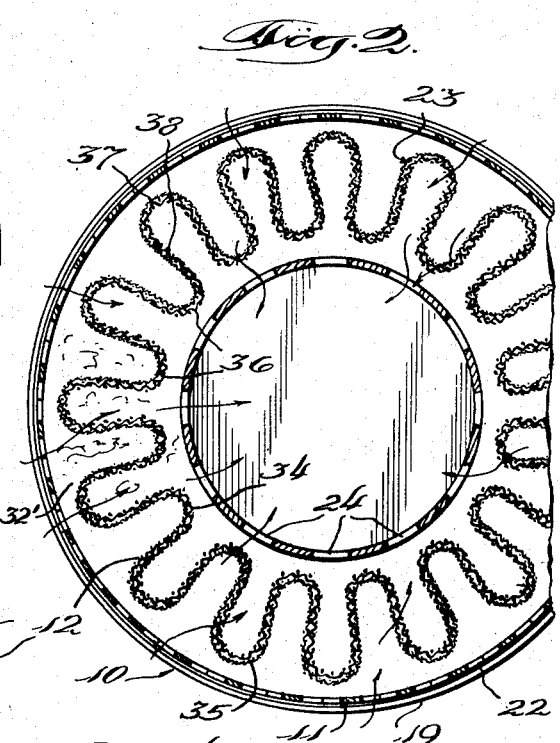
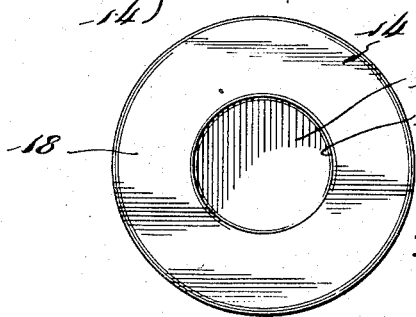
Inventor
Walter J. Newman
By McCaleb, Hewitt & Dickinson
Attorneys Jan. 7, 1947. W. J. NEWMAN 2,413,991
FILTER
Filed Oct. 13, 1943 3 Sheets-Sheet 3

Inventor
Walter J. Newman
By McCaleb, Wendt & Dickinson
Attorneys

Patented Jan. 7, 1947

2,413,991

UNITED STATES PATENT OFFICE 2,413,991

FILTER

Walter J. Newman, Chicago, Ill., assignor to Marvel Engineering Company, Chicago, Ill., a corporation of Illinois Application October 13, 1943, Serial No. 506,025

3 Claims. (Cl. 210—169)

The present invention relates to filters, and is particularly concerned with the provision of an improved filter having a particularly high efficiency and adapted to occupy a relatively small space.

One of the objects of the invention is the provision of an improved filter which is sturdy and which has in a relatively small volume a greatly increased area of active filtering surface over the devices of the prior art.

Another object of the invention is the provision of an improved filter which is simple, efficient, durable, adapted to be cleaned easily, and adapted to be used at high rates of flow and high or low pressures for long periods of time without necessity for repair or replacement of any of its parts.

Another object of the invention is the provision of an improved filter of the class described which is adapted to be manufactured at a very low cost and thus placed within the range of a vast number of users, and in which the filtering unit is adapted to be recleaned and reused many times so that there is no necessity for replacement of any of the parts of the filter under ordinary conditions of use.

Other objects and advantages of the invention will be apparent from the following description and the accompanying drawings, in which similar characters of reference indicate similar parts throughout the several views.

Referring to the drawings, of which there are two sheets,

Fig. 2 is a fragmentary sectional view taken on the plane of the line 2—2 of Fig. 1, looking in the direction of the arrows;

Fig. 3 is a top plan view of the filter;

Fig. 4 is a side elevational view, partially broken away to show the filtering unit;

Fig. 5 is a bottom plan view of the filter; and

Figure 1:
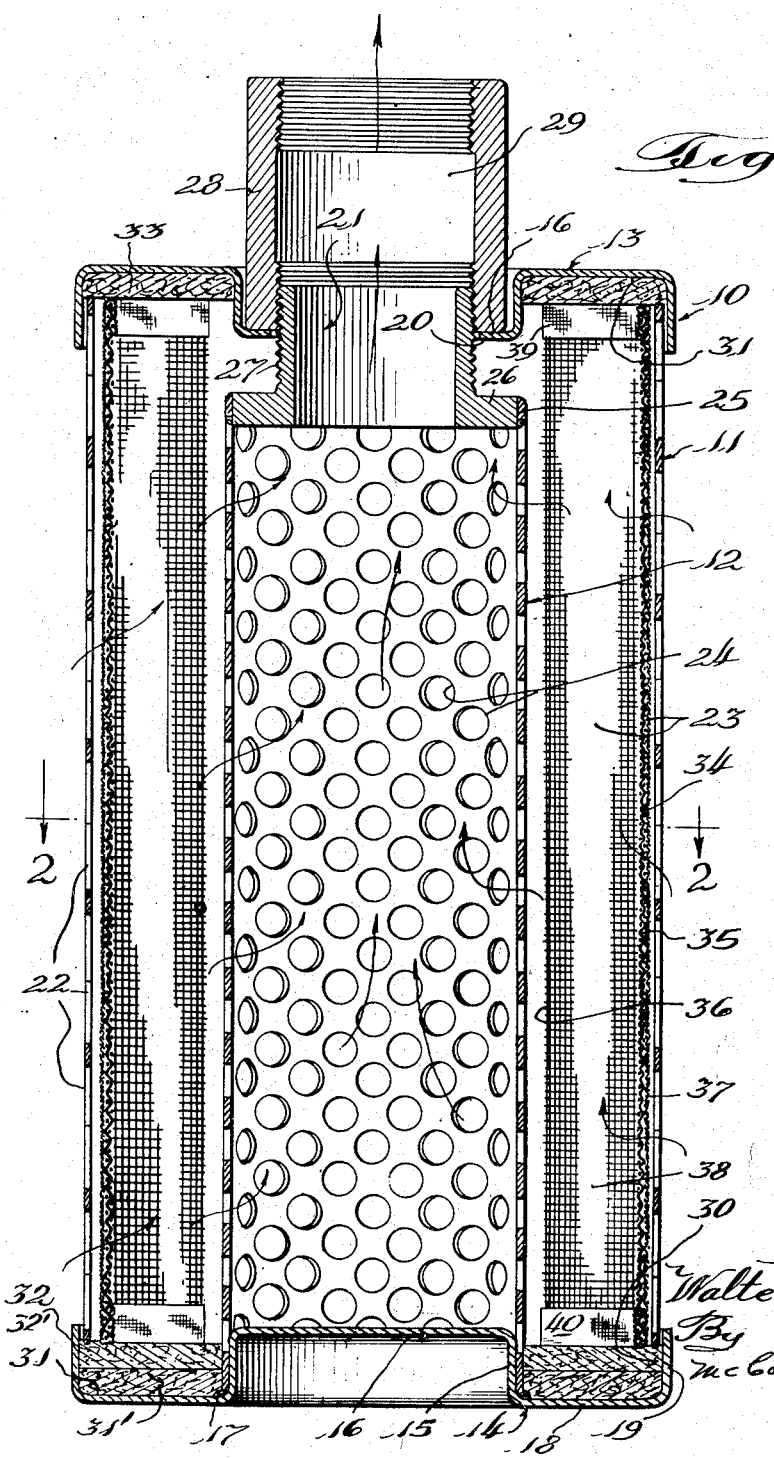
Fig. 1 is a sectional view taken on a plane passing through the axis of the filter, embodying my invention.

Referring to Fig. 1, the filter 10 embodying my invention is preferably provided with reinforcing and supporting inner and outer housings, the outer housing being indicated in its entirety by the numeral 11, and the inner housing by the numeral 12.

The housing includes a top plate 13 and a bottom plate 14, these plates serving to close the ends of both of these housings so far as they are intended to be closed.

The bottom plate 14, for example, may consist of a stamped sheet metal member, which is formed with a centrally located cylindrical flange 15 integrally joined to a circular portion 16, which closes the lower end of the inner housing 12. The diameter of the cylindrical portion 15 is preferably such that the inner housing 12 fits about the cylindrical portion 15, to which it is soldered at 17.

Integrally joined to the lower end of the cylindrical portion 15 is a radially and outwardly extending bottom flange 18, which carries an upwardly extending outer cylindrical flange 19. The outer cylindrical flange 19 is at such a diameter that it is adapted to receive the outer housing member 11. The top plate 13 is similar in construction to the bottom plate 14, except that its circular plate 16 is provided with a centrally located aperture 20 for passing a tubular conduit member 21, which is carried by the inner housing 12.

The outer housing member 11 is preferably formed of expanded metal, which has been so pressed that all of its parts are in substantially the same plane; and this housing member may be formed out of a rectangular sheet of such expanded metal, which has been formed into a cylinder and its adjacent edges soldered, brazed, welded, or otherwise secured together.

The outer housing member 11, as well as the inner housing and all other metallic parts of the filter, are preferably galvanized so as to protect them from corrosion, which might be induced by exposure to the elements or use in corrosive liquids.

The diamond shaped apertures 22 in the expanded metal of the outer housing 11 are of sufficient size to pass relatively thick liquids without restraint, but the expanded metal excludes all large particles of foreign matter from contact with the filtering unit 23, which is located between the housings.

The expanded metal is of sufficient strength, being preferably made of steel, so that it protects the filtering unit 23 against damage, whether it be by compression exerted against the strainer or by the filter being knocked about when it is connected to a hose and thrown into a receptacle or into engagement with some other hard object.

The inner housing member 12 is also preferably made of steel, being formed out of a rectangular sheet, which has punched in it a multiplicity of relatively small holes 24, the holes being staggered vertically and arranged in regularly spaced relation to each other circumferentially of the cylindrical member 12.

The ends of this rectangular sheet of metal are also soldered, brazed, or welded together to form a cylinder of sufficient size to fit on the cylindrical portion 15 of the bottom plate 14 and on the cylindrical surface 25 of the flange 26, which is carried by the tubular member 21.

The inner housing 12 is also soldered, welded, or brazed to the flange 26, and this inner housing is adapted to serve as a tension member as well as a conduit. Its tubular portion 21 is provided with external threads 27 adapted to engage with the inner threads of the standard nipple 28, which serves as a nut and as an extension of the conduit 29 inside the filter.

Annular spaces 30, 31 in the lower plate 14 and upper plate 13 are preferably provided with one or more wool or cotton felt washers 31, 32, and 33. These washers are adapted to engage the ends of the filter unit 23 and the ends of the outer housing 11 to provide the end plates with a resilient clamping action and to seal the ends of the filtering unit 23 against the passage of unfiltered liquid.

The washers 31—33 have a frictional fit in the annular chambers 30, 31 so that they are adapted to remain in place until removed by means of a tool.

The filtering unit 23 preferably consists of a layer or frame of galvanized wire cloth 34 located inside a second layer 35 of filtering material, such as bronze wire gauze of very fine mesh, such as, for example, 100 meshes to the square inch.

The galvanized wire cloth may be relatively coarse, such as for example, eight meshes to the inch more or less, and the gauze is supported and reinforced by the wire cloth, which provides a stiff form for the gauze.

The filtering unit is preferably substantially of the same length as the outer housing 11, so that both the filtering unit and the outer housing may be clamped simultaneously between the upper felt washer 33 and the lower felt washers 31', 43' by the end plates 13, 14.

The shape of the filtering unit in plan is that it is generally cylindrical, but the outline of the gauze and wire cloth in plan is that it is radially synclinal or sinuous, being formed with a plurality of easy bends 36 on the inside and all at the same radius, and a plurality of easy bends 37 on the outside, all located at substantially the same radius, and these bends are connected by the radially extending portions 38.

The filtering unit may be made out of a long rectangular sheet of galvanized wire cloth, to which there is applied a sheet of practically similar length of bronze gauze, which is wider, so that the upper and lower edges of the gauze may be folded over at 39 and 40 and soldered to the wire cloth, if desired. As a matter of fact, after the wire gauze and its galvanized wire cloth frame have been bent to the sinuous and generally cylindrical form, the gauze is permanently anchored on the galvanized wire frame, and it is only necessary to solder together the abutting or overlapping ends of the gauze and wire mesh, where they join, to form the generally cylindrical form, as for example, at one point in the circumference of the filtering unit.

Although the ends of the filtering unit are sinuous and irregular, the free edge surface of the filtering unit is adapted to be engaged by the felt washers 31'—33 so as to prevent the passage around the ends of any unfiltered liquid.

The galvanized wire cloth is adapted to maintain the gauze in the desired shape and to prevent its local collapse, while the inner housing 12 is adapted to be engaged by the inner easy bends 36 when the filtering unit is under pressure, to prevent the collapse of the unit from its generally cylindrical form.

While the easy bends 36 are shown out of contact with the inner housing 12, they may be forced into contact with the inner housing when the gauze becomes partially filled and it is subjected to a predetermined amount of pressure. This pressure acts radially and tends to cause the resilient sinuous filtering unit to contract with its folds closer together so that it has a smaller inner diameter engaging the inner housing 12.

Due to the use of a metallic gauze as the filtering unit, the present filter may be cleaned and used over again practically an unlimited number of times by merely reversing the flow temporarily during a cleaning operation; and due to its shape and structure the present filter has a greatly increased effective filtering area over the devices of the prior art. This gives it a much greater efficiency for the same size filter unit than is evidenced by the prior art devices.

The present filter is simple in structure and easy to assemble so that it may be manufactured at a low cost, and it thus provides a better filter at a lower cost than any of the devices of the prior art.

The assembly of the device will be apparent from the foregoing drawings. The inner housing 12 is permanently attached to the bottom plate 14, as described, and to the upper tubular member 21. The washers 31', 32' may be placed in the bottom plate 14, and the filtering unit 23 may be slid over the inner housing 12. The outer housing may then be slid over the filtering unit into the recess 30 of the bottom plate 14, and then the top plate may be placed over the tubular member 21, the top plate having been previously provided with its felt washer 33.

The length of the tubular member 21 is such that there is a threaded portion projecting for engagement with the nipple 28, which serves both as a nut and a conduit. When the nipple 28 is threaded home, it places the inner housing 12 under tension and drives the upper plate 13 against the filtering unit 23 and the outer housing 11 to clamp them between the felt washers of the upper and lower end plates.

The filtering unit may be formed by utilizing a plurality of rods set in a base to engage inside the easy bends 36, 37, and the assembled galvanized wire and gauze may be bent about these rods as the rods are put in place, until the sinuous member of sufficient length has been formed.

Figure 6:
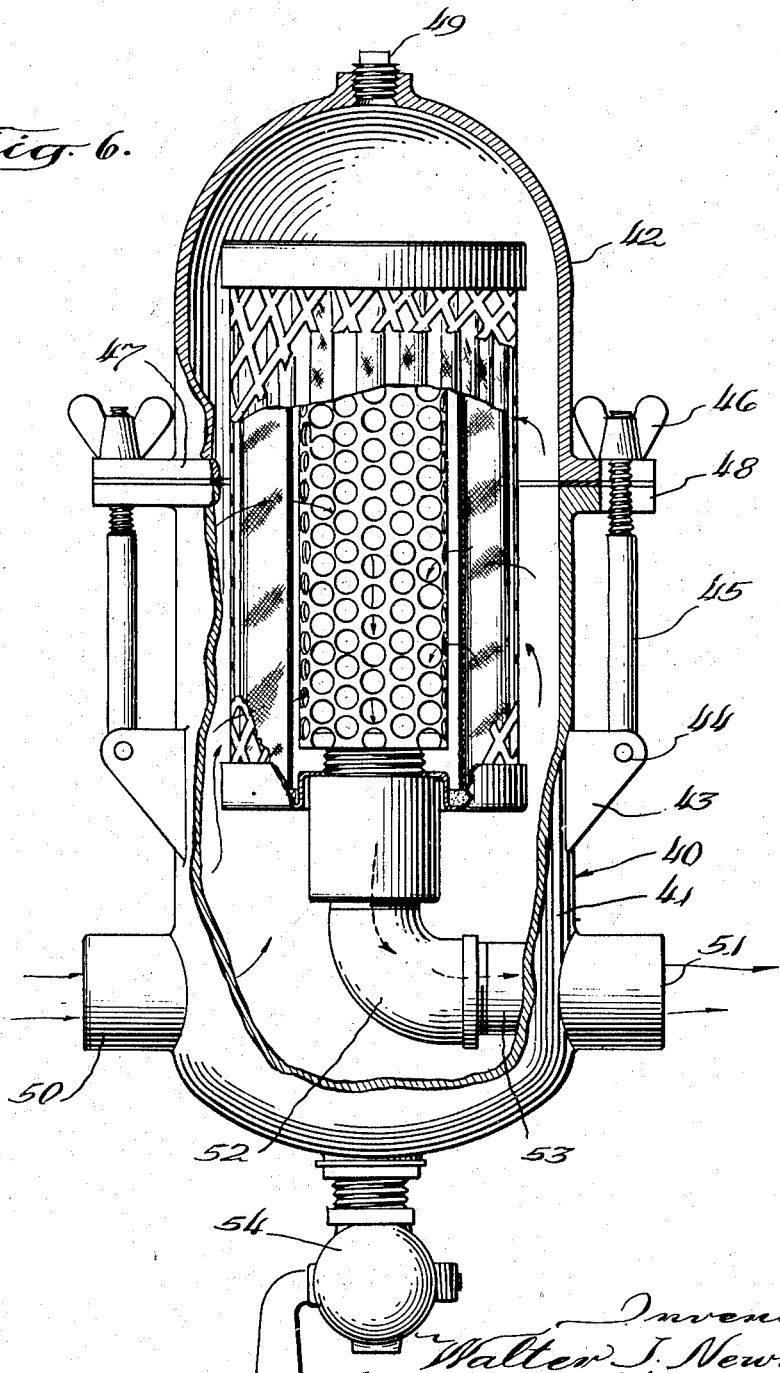
Fig. 6 is an elevational view in partial section, showing an arrangement for enclosing the filter in a housing when it is to be interposed in a pipe line.

Referring to Fig. 6, this is an elevational view in partial section, showing one mode of arranging the filter in a housing so that it may be interposed in a pipe line. In this embodiment 40 indicates the housing in its entirety, which is provided with a lower half 41 and an upper half 42 of substantially cylindrical shape, the two halves being provided with flanges 47 by means of which they may be joined to form a liquid-tight housing. A suitable gasket is preferably interposed between the flanges 47.

The lower half housing is preferably provided with a threaded inlet conduit 50 and a threaded outlet conduit 51, and with a suitable threaded lower discharge opening for receiving a clean-out plug or a valve 54. By providing the pipes which connect to the conduits 50, 51 with suitable turn-off valves, the assembly may be isolated in any system, and sludge may be cleaned out of the bottom of the housing by means of the valve 54 and by removing the plug 49 at the top, if necessary.

Another mode of cleaning out the loose sludge is to flush it out by applying suitable flushing liquid at any one of the conduits or openings.

The two half housings are held together by a pair of bolts 45, each bolt being pivoted at 44 by bearing flanges 43 carried by the lower housing half 41 and each bolt being provided with a wing nut 46 for engaging above the flanges 47, when the bolts are located in the slots 48.

The filter unit may be supported in the housing and connected to the outlet conduit 51 by a short section of pipe 53, threaded in the outlet 51, and provided with an elbow 52, the upper end of which is threaded into the collar 28 for supporting the filter unit 10 in upright position in the housing 40.

It will thus be observed that I have invented an improved filter which is simple, economical to manufacture, sturdy, and highly efficient for its size. The present device has very few parts, and may be assembled very easily by unskilled labor.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a filter, the combination of a substantially cylindrical central core member of apertured sheet metal, said core member being provided upon its upper end with an annular metal fitting of tubular shape threaded to be engaged by a tubular threaded member, a substantially flat annular metal member having an inwardly extending cup-shaped cylindrical formation received in and secured to said core and having a radially extending flange for supporting a gasket, said radially extending flange also carrying an inwardly turned cylindrical retaining flange, a similar metal member for the opposite end of said filter, comprising an annular member having an inwardly extending cup-shaped depression, a flat annular flange for receiving a gasket and an inwardly extending cylindrical retaining flange, said latter cup-shaped member having an aperture to receive the threaded tubular portion of said fitting, a filter unit of stiff characteristics adapted to resist compression as a column, said filter unit being interposed between the gaskets of the first cup-shaped member and the second cup-shaped member and clamped between said gaskets by means of said tubular threaded member.

2. In a filter, the combination of a substantially cylindrical central core member of apertured sheet metal, said core member being provided upon its upper end with an annular metal fitting of tubular shape threaded to be engaged by a tubular threaded member, a substantially flat annular metal member having an inwardly extending cup-shaped cylindrical formation received in and secured to said core and having a radially extending flange for supporting a gasket, said radially extending flange also carrying an inwardly turned cylindrical retaining flange, a similar metal member for the opposite end of said filter, comprising an annular member having an inwardly extending cup-shaped depression, a flat annular flange for receiving a gasket and an inwardly extending cylindrical retaining flange, said latter cup-shaped member having an aperture to receive the threaded tubular portion of said fitting, a filter unit of stiff characteristics adapted to resist compression as a column, said filter unit being interposed between the gaskets of the first cup-shaped member and the second cup-shaped member and clamped between said gaskets by means of said tubular threaded member, said filter unit comprising a sinuous supporting frame of stiff wire mesh and a layer of fine filtering wire gauze extending over said wire mesh on one side thereof and folded over at the ends of said wire mesh for securement to the wire mesh, said wire mesh forming a unit of substantially cylindrical shape with sinuous bends and radial portions extending inward and outward.

3. In a filter, the combination of a centrally located housing adapted to receive fluid passing through the filter, said housing being perforated at spaced points from end to end and about its periphery, a pair of cover plates, one of said cover plates having a cylindrical formation adapted to be received in said housing and secured thereto and having a radially extending flange and a cylindrical border flange and forming an annular groove at one end of the filter, the other of said cover plates being movably mounted upon a cylindrical threaded member carried by said housing, and being likewise formed with an annular groove facing the first-mentioned groove, both of said grooves being provided with compressible, fibrous gasket members adapted to serve as a seal at the ends of a filter element and to filter such leakage as may pass through them, and a filter unit, the said filter unit comprising a frame of coarse wire of substantially cylindrical shape but having inwardly and outwardly extending radial sinuous bends joined by easy curves, the said frame of coarse wire being covered by a fine wire gauze extending from end to end of the frame and being secured by being bent about each end of said frame, and an outer perforated housing adapted to protect the gauze and to keep from the filter the coarse material which would otherwise engage the gauze, the said filter unit and outer housing both being engaged by said fibrous gasket members in said annular grooves to prevent the passage of fluid without filtering, and said outer housing and frame being placed under compression by a second threaded member engaging said movable plate and threaded on said first threaded member to place said first-mentioned housing under tension to effect assembly of the filter.

WALTER J. NEWMAN.